UNITED STATES PATENT OFFICE.

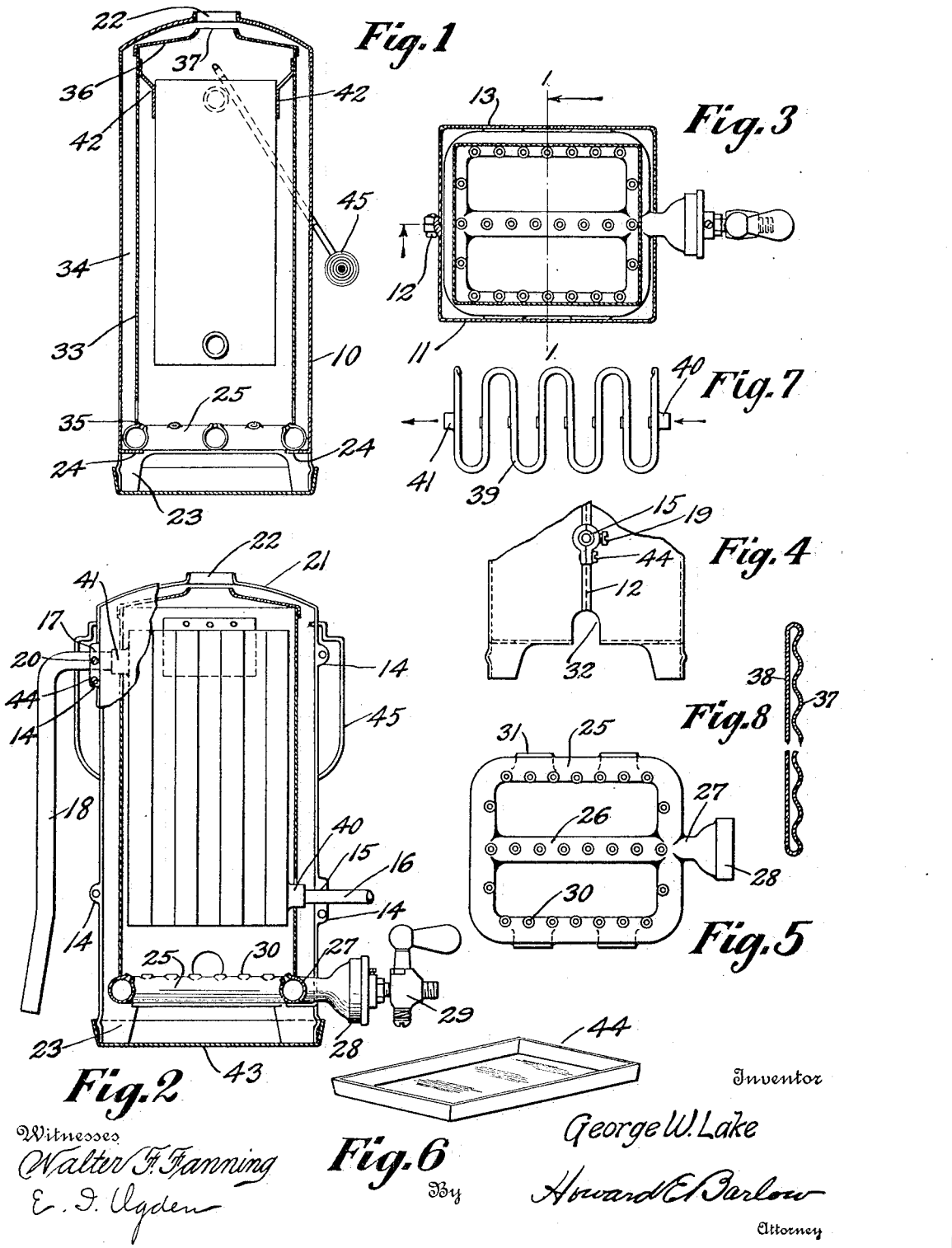

GEORGE W. LAKE, OF RUMFORD, RHODE ISLAND, ASSIGNOR TO METACOMET CORPORATION, OF RUMFORD, RHODE ISLAND, A CORPORATION OF RHODE ISLAND.

PORTABLE WATER-HEATER.

1,121,260.  Specification of Letters Patent.  Patented Dec. 15, 1914.

Application filed February 4, 1914. Serial No. 816,653.

*To all whom it may concern:*

Be it known that I, GEORGE W. LAKE, a citizen of the United States, and resident of Rumford, town of East Providence, in the county of Providence and State of Rhode Island, have invented certain new and useful Improvements in Portable Water-Heaters, of which the following is a specification.

This invention relates to portable water heaters more particularly adapted for domestic service, and has for its object to provide an improved apparatus of simple, inexpensive and practical construction adapted to be readily connected to the faucet of the water supply in a bath-room or other convenient place and also connected to the gas supply whereby the burner when ignited is adapted to supply sufficient heat to rapidly raise the temperature of the water passing through the heating chamber therein.

A further object of the invention is to so construct the device that it may be readily assembled and taken apart for inspection and repairs and also to so construct the same that the parts are firmly supported one within the other so that they will not become loose and rattle.

With these and other objects in view, the invention consists of certain novel features of construction, as will be more fully described and particularly pointed out in the appended claims.

Of the accompanying drawing: Figure 1 is an end elevation on line 1—1 of Fig. 3. Fig. 2 is a side elevation, partly in section, showing one half of the outer casing removed. Fig. 3 is a plan view, partly in section, showing the outer casing in section with the burner supported therein. Fig. 4 is a front elevation showing a portion of the outer casing. Fig. 5 is a plan view of the multiple burner frame. Fig. 6 is a perspective view of the bottom drip pan. Fig. 7 is a top view of the heating chamber bent into a series of transverse folds. Fig. 8 is a sectional view through a portion of the water chamber showing the plain and corrugated walls located adjacent each other.

Referring to the drawing, 10 designates the outer casing which is preferably made of a very thin casting, such as stove plate, or the like, said casting being made in halves, the edge of one half 11 having a lip 12 overlapping the edge of the other half 13. Each of the halves are provided with suitable ears 14 through which screws are passed for securing the two halves together. On the parting line are formed two openings one in front at 15 to receive the water inlet pipe 16, and one in the rear at 17 to receive the water outlet pipe 18. Screws 19 and 20 are provided in these respective bosses for binding these pipes firmly after having been positioned therein. The upper portion of the casing is provided with a top 21 through which a central vent opening 22 is formed, and the lower portion of the casing is left open and is provided with supporting legs 23. At intervals around the lower opening of this casing an inwardly turned flange, or fingers 24, are formed, see Fig. 1, for the purpose of supporting the burner frame 25 when positioned in this casing. This burner frame is hollow and formed preferably in somewhat of a rectangular shape with a central cross bar 26 passing therethrough and having an outwardly extending neck portion 27 provided with an enlarged mixing chamber 28 into which the gas cock 29 is connected by suitable gas regulating mechanism—for instance as shown in my copending application Serial No. 816,654. This frame is provided with a plurality of jet openings 30 through which the gas issues and burns in a blue flame, and the frame is provided with a number of feet or lateral projections 31 for engaging corresponding flanges 24 in the casing on which the same is supported. The outer casing is cut out at 32, see Fig. 4, to permit this neck portion 27 to pass therethrough.

An inner casing 33 is formed preferably of sheet metal, a little smaller than the outer casing, providing an air space 34 all around between said inner and outer walls, which air space serves to prevent an excess radiation of heat through the outer casing. The lower edge 25 of this inner casing rests on the burner frame just outside of the gas nipples whereby the flame and heat is confined within the inner casing. The upper edge of this inner casing is provided with a cover 26 with a vent outlet 37 registering with the corresponding outlet 22 of the outer casing.

One of the essential features in my improved heater is the construction and arrangement of the water chamber which is formed of sheet metal, one side of which is corrugated as at 37, see Fig. 8, and the other side 38 is left plain, the walls being adjacent each other whereby the water in passing through the same is spread out into a thin film or sheet to be more readily acted upon and affected by the heat from the burner below. These double walls are bent back and forth into a plurality of transverse folds 39, see Fig. 7, whereby the chamber is rendered more or less flexible and yieldable so as to readily accommodate itself to the expanding and contracting action of the heat and cold upon it without liability of cracking or rupturing the plates. This water chamber is provided with an inlet opening at 40, near the lower end of the first fold and an outlet opening 41 near the top edge of the last fold, whereby the water in entering is obliged to pass around through all of the various folds and work its way from the bottom to the top before it is permitted to pass out therefrom.

In order to retain the inner casing relative to the water chamber and to prevent any movement of one relative to the other, so as to avoid rattling or cracking of the parts, I have constructed a pair of yieldable clips or fingers 42 permanently connected to the inner wall of the inner chamber and extending inwardly and downwardly to engage opposite sides of the water chamber, the spring or yieldable action of which fingers effectually prevent the relative movement of these parts and holds them in proper position.

It is found in practice often necessary to provide a drip pan 43 which is placed beneath the outer casing whose legs set thereinto, the flange 44 of said pan being of a resilient nature so that when the legs of the casing are set thereinto the flanges of the pan will spread slightly and grip the legs and hold the pan permanently in position thereon.

In the assembling of the parts of my improved heater I place the water chamber within the inner casing and screw both the inlet pipe 16, and the outlet pipe 18 in position therein. I then position the burner in one half of the outer casing and place the other half over the whole which are then secured together by means of screws 44 through the various ears 14. It will be seen by this construction that the inner casing rests upon the burner frame and in order to bind the whole firmly in position I set up on the screws 19 and 20, which binds the inlet and outlet pipes in their respective bosses. The bottom pin 43 is next positioned and then the handle 45 may be sprung in place and the device is ready for use. Any of the usual flexible connections may be employed for joining or connecting the water inlet to an ordinary faucet, and any of the ordinary connections may be employed for readily connecting the gas inlet to the gas jet, and if desired a flexible tube may be connected to the outlet pipe 18 for conducting the water therefrom to any particular bowl or basin.

I claim:

1. A portable water heater comprising an outer casing open at its lower end and approximately rectangular in cross section, said casing having a top with a vent opening therein, inwardly turned supporting members around the lower open end of said outer casing, a burner resting on said members, an inner casing having its lower edges resting upon said burner, said inner casing being of the same general shape in open section as the outer casing and spaced apart therefrom to form an air space between them, and a water chamber substantially rectangular in general outline disposed in said inner casing, with its lower edges spaced a short distance above said burner.

2. A portable water heater comprising an outer casing open at its lower end and having a head at its top with a vent opening therein, an inwardly turned supporting flange adjacent the lower end of said outer casing, a burner supported on said flange, an inner casing resting upon said burner, and spaced from said outer casing to form an air space between said casings, and a water chamber comprising closely spaced apart walls bent into serpentine shape to form a single element extending through said inner casing above said burner.

3. A portable water heater comprising an outer casing open at its lower end and having a head at its top with a vent opening therein, an inwardly turned supporting flange adjacent the lower end of said outer casing, a burner supported on said flange, an inner casing resting upon said burner and spaced from said outer casing to form an air space between said casings, and a water chamber formed of a flat and a corrugated wall spaced closely apart and bent into serpentine shape to form a single element extending through said inner casing above said burner.

4. A portable water heater comprising an outer casing open at its lower end and having a head at its top with a vent opening therein, an inwardly turned supporting flange adjacent the lower end of said outer casing, a burner supported on said flange, an inner casing resting upon said burner and spaced from said outer casing to form an air space between said casings, a water chamber supported in said inner casing and comprising a single element composed of closely spaced apart walls each bent into serpentine shape to cause the water to pass in a thin film over said burner, an inlet at the lower end of said chamber and an outlet at the upper end of said chamber.

In testimony whereof I affix my signature in presence of two witnesses.

GEORGE W. LAKE.

Witnesses:
HOWARD E. BARLOW,
E. I. OGDEN.

Copies of this patent may be obtained for five cents each, by addressing the "Commissioner of Patents, Washington, D. C."